United States Patent [19]

Greenhalgh et al.

[11] 3,981,653
[45] Sept. 21, 1976

[54] APPARATUS FOR THE MANUFACTURE OF AN ELECTRICAL CONDUCTOR COVERED WITH A CROSSLINK CURED POLYMERIC INSULATION

[75] Inventors: Milton Sharples Greenhalgh; Ray Clarence Lever, both of Fairfield, Conn.

[73] Assignee: General Electric Company, New York, N.Y.

[22] Filed: Jan. 3, 1975

[21] Appl. No.: 538,353

[52] U.S. Cl. .......................... 425/113; 425/174.8 R; 425/378 R
[51] Int. Cl.² ............................................ B29F 3/08
[58] Field of Search .......... 425/113, 114, 378, 379, 425/392, 174.8 R, 144; 264/25, 40, 176 R

[56] References Cited
UNITED STATES PATENTS

| | | | |
|---|---|---|---|
| 2,366,528 | 1/1945 | Heath | 425/113 |
| 2,443,594 | 6/1948 | Boettler et al. | 425/174.8 R X |
| 2,541,201 | 2/1951 | Buecken et al. | 425/379 X |
| 2,688,770 | 9/1954 | Henning | 425/378 X |
| 2,742,669 | 4/1956 | Rhodes | 425/379 X |
| 3,521,325 | 7/1970 | Schippers | 425/379 X |
| 3,870,451 | 3/1975 | Gokcen | 425/378 R X |

FOREIGN PATENTS OR APPLICATIONS 573,312   11/1945   United Kingdom................. 425/113

*Primary Examiner*—Francis S. Husar
*Assistant Examiner*—Mark Rosenbaum
*Attorney, Agent, or Firm*—R. G. Simkins; P. L. Schlamp; F. L. Neuhauser

[57] ABSTRACT

An apparatus for the continuous extrusion molding of a curable polymeric material about an elongated conductor. The apparatus includes electrical induction heating means for the precise and isolated application of heat to a limited portion of a progressively advancing mass of curable polymeric material immediately prior to its continuous entry into and passage through a forming die and its molding therein to shape.

7 Claims, 2 Drawing Figures

3,981,653

APPARATUS FOR THE MANUFACTURE OF AN ELECTRICAL CONDUCTOR COVERED WITH A CROSSLINK CURED POLYMERIC INSULATION

BACKGROUND OF THE INVENTION

The manufacture by continuous production processes, such as extrusion molding, of insulated wire or cable and similar elongated products comprising polymeric materials which crosslink cure upon raising their temperature to a particular level, require ancillary means and a secondary operation to heat the continuously moving shaped polymeric material emanating from the molding device to its crosslinking curing condition substantially uniformly through the mass thereof.

A common means of imparting the temperatures necessary to effect a crosslink curing within a continuously moving polymeric material or product thereof, comprises conveying the molded-to-shape material or product through a body of a heating fluid such as steam in sequence with and at the same rate as its formation in the continuous molding operation. Conventional systems for heating fast moving products of high rate production operations with fluids such as steam require retention chambers or enclosures of extensive lengths. Steam curing chambers, for example, can extend for about 200 feet or more to provide sufficient dwell time therein for the fast moving products to achieve both the necessary heating and cooling uniformly through the body of the material under a pressure adequate to offset the deleterious expansion of any gases within the material. The space requirements as well as costs and cumbersome operating conditions, among other handicaps, for the aforesaid fluid type of heating systems have prompted the proposal of more compact heating means such as electrical or other heat generating devices employed in connection with the extruding unit or other continuous forming apparatus. For example, electrical heating units have been applied about or within extruder barrels, the area of their outlet or die, and the like portions of extruding apparatus.

However, heating systems or units associated with or applied to the extruding unit, or simply with an enclosed continuous forming apparatus, are especially troublesome when molding polymeric materials which crosslink to an infusible or permanently heat stable state upon the application of heat because of the possible occurrence of a premature crosslinking of the polymeric material while within the forming apparatus, molding die, or other enclosed portions of the system. A substantial degree of crosslinking of the polymeric material prior to its molding to shape and discharge from the confining die or shape imparting means not only disrupts the molding or degrades the product itself, it also can obstruct the die or extruder or other enclosure and thereby terminate production which requires a substantial effort to free the apparatus and resume the production system in addition to the loss of products.

Moreover, the problem of premature crosslinking of heat activated polymeric materials is very often accentuated by the fact that most crosslinking reactions are exothermic whereby once initiated, the crosslinking action progresses autogentically or independent of external heat sources. Also, the fast or responsive control or changing of thermal conditions within and about typical extruding apparatus is all but impossible because of the relatively high specific heat and heat sink effect of their massive steel or other metal bodies which enclose the heat activatable polymeric material during its plasticizing and molding.

SUMMARY OF THE INVENTION

This invention comprises an improved apparatus for the continuous plasticating and precision heating of a heat activated, crosslink curable polymeric compound and the continuous forming therefrom an insulating covering about a moving elongated electrical conductor.

The novel apparatus of this invention comprises an extruder provided with a uniquely constructed electrical induction heating means, including an electrical coil surrounding the entry to the forming die and a heat generating core member within the forming die entry which is thermally isolated from all other components or parts of the apparatus. The apparatus thus provides for the precise and isolated application of heat to a confined and specific portion of the heat activated crosslink curable polymeric material continuously advancing through the system immediately prior to its entry into and passage through the forming die.

OBJECTS OF THE INVENTION

It is a primary object of this invention to provide a novel and improved apparatus for the continuous plasticating and heating of a heat activated, crosslink curable polymeric compound or material and the forming or molding therefrom of an insulating covering about a moving elongated conductor.

It is also an object of this invention to provide a continuous plastic molding apparatus having heating means which provide for the precise and isolated application of heat or thermal energy to only a limited area of a heat activated, crosslink curable polymeric material progressively moved therethrough, and in turn increasing the temperature of only a specific portion of such a passing material substantially within an exact location.

It is a further object of this invention to provide a novel plastic extrusion molding apparatus for the continuous formation of an insulating covering of heat activated, crosslink curable polymeric materials or compounds about electrical conductors such as wire or cable, which enables the precise and controlled application of heat to a specific and limited portion of the progressively moving heat sensitive polymeric material and the effective confinement or isolation of the heat from adjacent portions of the same heat sensitive polymeric material.

DESCRIPTION OF A PREFERRED EMBODIMENT

Figure 1:
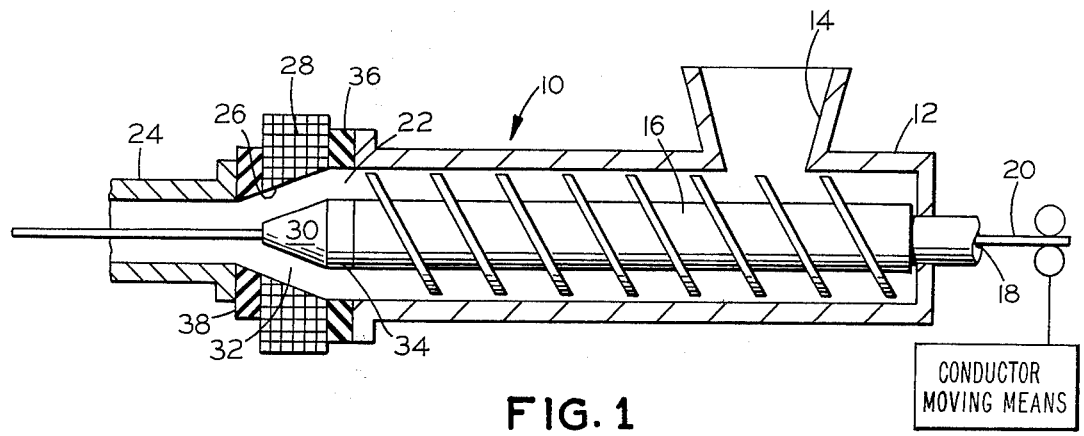
FIG. 1 of the drawing comprises a schematic illustration of one embodiment of an apparatus of this invention with part in cross section and part in elevation; and, FIG. 2 of the drawing comprises a schematic illustration of another embodiment of an apparatus of this invention with part in cross section and part in elevation.

Referring to FIG. 1 of the drawing, the apparatus of this invention includes an extruder unit 10 for the continuous plasticizing and movement or advancement of plastic material into and through a forming die whereby it is molded about a conductor continuously traveling through the die producing an insulating covering or coating of the plastic material over the conductor.

The improved apparatus comprises an extruder barrel 12 or housing provided with an inlet opening 14 for the introduction and feeding of heat activated, crosslink curable polymeric materials or compound such as ethylene-containing polymers containing a heat activated organic peroxide crosslink curing agent. Extruder barrel 12 contains an extruder screw 16 provided with a bore 18 extending through the longitudinal axis of the screw for the passage of an elongated conductor 20, such as a wire, therethrough and into and through the die forming means together with the plastic material. The extruder barrel 12 has a downstream outlet passage 22 which adjoins or leads to a forming die 24, and the extruder screw 16 housed therein terminates with its downstream end adjacent to the outlet passage 22 of the barrel.

The die forming means comprises a channel die 24 consisting of a confining passage of the same cross sectional configuration as the product to be produced, and which thereby imposes its designed configuration upon the moving plastic material progressively forced therethrough under compression by the screw 16. In the apparatus of this invention, the heat curable plastic material is progressively advanced along the length of the extruder by the revolving screw 16 and moved into and through channel die 24 wherein it is molded to shape about conductor 20 as the conductor also moves therethrough positioned approximately concentrically with the die. To facilitate the uniform advancement of the plastic material and its introduction into the die, a converging entry 26 to the die 24 is provided, which desirably is substantially symmetrical with respect to the configuration of the extruder barrel and die so as to minimize irregular flow patterns or stagnant pockets or zones.

According to this invention, an electrical induction coil 28 is provided surrounding the area of the die entry 26, or approximately intermediate the downstream ends of the extruder barrel and screw, and the die. The induction coil 28 is operatively combined with a cooperating heat generating metal core 30 which is positioned substantially concentrically within and spaced apart from the die entry 26 so as to provide an annular passage 32 therebetween. Thus, the specified arrangement operatively locates the metal core 30 substantially encircled inside the electrical coil 28, and further provides for the progressive movement of a relatively uniform and thin body or layer of the plastic material over the face of the heat generating core 30 as it advances through the annular passage 32 between the core 30 and the entry 26 to the die 24. In the embodiment shown in FIG. 1, the heat generating metal core 30 is mounted and affixed to the downstream end of the extruder screw 16 adjacent the extruder outlet end.

Further in accordance with this invention, a body of thermal insulation 34 is interposed between the downstream end of the extruder screw 16 and the heat generating core 30 affixed to its end to insulate the screw from the heat generated by the core 30 and effectively isolate the area or sphere of heating produced by the core 30 to the location of the entry 26 and immediately adjoining the forming die 24. Also, to achieve the maximum isolation of confinement of the generated heat, and concentration and precision in its application, thermal insulating material 36 or means is positioned intermediate the extruder barrel 12 and the electrical coil 28 and thermal insulating material 38 is positioned between the electrical coil 28 and the die member 24.

In the operation of the apparatus of this invention, the application of heat to a heat activated, crosslink curable polymeric material or compound thereof, progressively advancing through the system, can be confined to only that progressing portion of such heat activated material immediately entering the forming die wherein it is rapidly molded to shape and then cured. Moreover, in addition to isolating the area of heating, the apparatus of this invention provides for the rapid and uniform heating of the material continuously moving therethrough by causing its passage in a relatively thin and uniform annular mass over the heating surface of the interior core and intermediate said interior core and the surrounding structure of the electrical induction coil.

Figure 2:
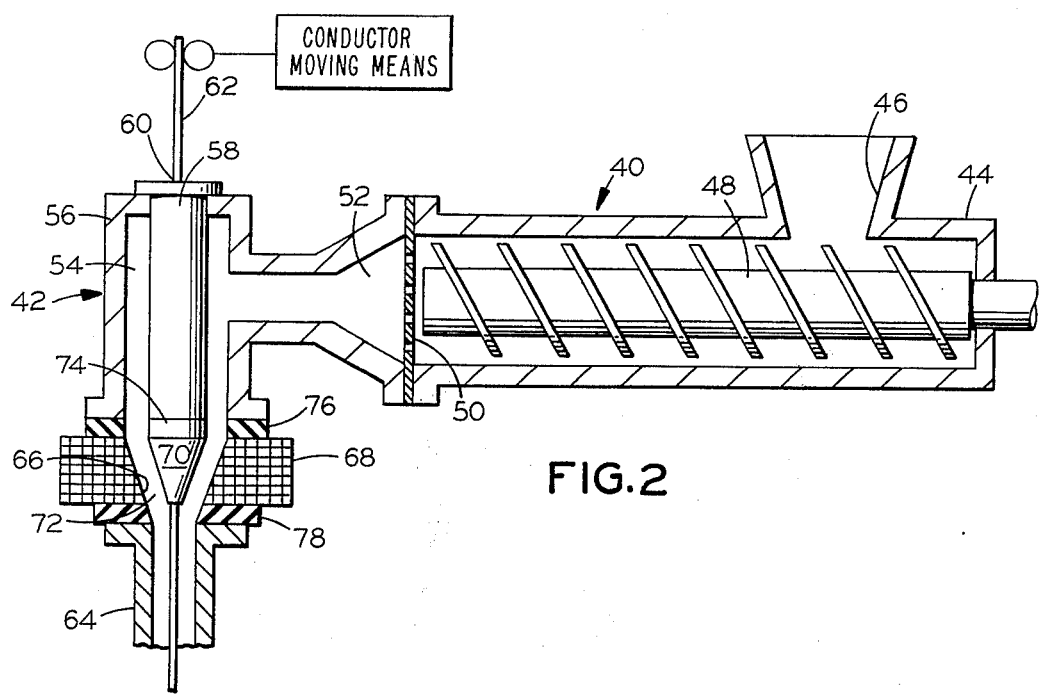

In the embodiment of FIG. 2, the extruder unit 40 is combined with a cross head unit 42 which comprises a conventional device and system for the extrusion molding of plastic insulating materials about electrical conductors such as wires or cables to form insulating covering or coatings thereon.

This embodiment also includes an extruder barrel 44, a feed inlet opening 46, and a screw 48 contained within the barrel for the plastication and progressive advancement of plastic material through the apparatus. Extruder unit 40 can additionally be provided with the usual extruder breaker plate 50, which simply comprises a perforated strainer to intercept the passage of insufficiently plasticized and/or mixed bodies or lumps of polymeric compounds.

The downstream end or outlet passage 52 of the extruder unit 40 leads to and adjoins a traversing passage 54 within the housing 56 of cross head unit 42. A guide member 58 is positioned substantially concentrically within traversing passage 54 and spaced apart from housing 56 of the cross head so as to provide an annular area thereabout. Guide member 58 is provided with a bore 60 extending through its longitudinal axis for the entry of an elongated conductor 62 such as wire and its passage into and through the die forming means together with the plastic material.

Traversing passage 54 leads to and adjoins a forming die 64, and guide tube 58 is concentrically located within said traversing passage and terminates with an end adjacent to the entrance to die 64.

The forming die 64 comprises a channel die of the same general construction as embodied in the apparatus of FIG. 1. Also, as in the operation of the apparatus of FIG. 1, the extruder screw 48 progressively advances the plastic material along the length of the extruder barrel to the outlet passage 52 and continuously moves it through the adjoining traversing passage 58 annularly about guide member 58 and into and through channel die 64 and about the conductor 62 simultaneously moving therethrough.

Also as in the embodiment of FIG. 1, the channel die member 64 of the cross head unit 42 is provided with a converging entry 66 for similar reasons.

In this embodiment of the invention an electrical induction coil 68 is provided surrounding the area of the die entry 66, and a cooperating heat generating metal core 70 is positioned substantially concentrically within and spaced apart from the die entry 66 so as to provide an annular passage 72 therebetween. As in the former embodiment, the core 70 is operatively substantially encircled within the electric coil 68, and provides a heating surface for the plastic material passing thereover. In the FIG. 2 embodiment, the heat generating core 70 is mounted on and affixed to the end of the guide member 58 which terminates adjacent to the die entry 66.

Also according to this invention, a body of thermal insulation 74 is interposed between the end of guide member 58 and the heat generating core 70 affixed to its end. Additionally for optimum effectiveness a body of thermal insulating material 76 or means is provided intermediate the cross head housing 56 and the induction heating coil 68 and a body of thermal insulating material 78 is provided intermediate the die member 64 and the induction coil 68 to isolate the generated heat and concentrate the location of its application to the plastic material moving into and through the die.

Although the invention has been described with reference to certain specific embodiments thereof, numerous modifications are possible and it is desired to cover all modifications falling within the spirit and scope of the invention.

What we claim as new and desire to secure by Letters Patent of the United States is:

1. An apparatus for the continuous plasticating and heating of a heat activatable, crosslink curable polymeric compound and forming therefrom a crosslink cured polymeric insulating covering about a moving elongated electrical conductor, comprising:
   a. plastic forming means comprising an extruder barrel having an outlet passage at one end leading to a channel die having a converging entry thereto for the continuous molding of plastic polymeric material progressively moving therethrough;
   b. means located upstream of said die for continuously moving an elongated electrical conductor through the channel die;
   c. means comprising a rotatable extruder screw within the extruder barrel for plasticizing and continuously progressively moving a heat activatable, crosslink curable polymer compound into and through the converging entry and channel die and thereby continuously molding said curable polymer compound about the elongated conductor moving through the die;
   d. electrical induction heating means comprising a combination of an electrical induction coil positioned surrounding the area of the converging entry to the channel die and a cooperating heat generating metal induction core member positioned substantially concentrically encircled within and spaced apart from the converging entry to the channel die whereby a heat activated, crosslink curable polymer compound continuously progressively moving into and through the die passes over the heat generating metal induction core and the temperature thereof is abruptly increased; and
   e. thermal insulating means isolating the heat generating metal induction core from other components of the apparatus to thereby confine the heating of the continuously progressively moving heat activated, crosslink curable polymer compound to the portion thereof entering into the channel die.

2. The apparatus of claim 1, wherein the means for plasticizing and progressively moving a heat activated, crosslink curable polymer compound into and through the converging entry and channel die comprises an extruder barrel having an outlet passage at one end leading to the die entry, and containing therein a rotatable extruder screw.

3. An apparatus for the continuous plasticating and heating of a heat activatable, crosslink curable polymeric compound and forming therefrom an insulating covering about a moving elongated electrical conductor, comprising:
   a. plastic forming means comprising an extruder barrel having an outlet passage at one end leading to a channel die having a converging entry thereto for the continuous molding of plastic polymeric material progressively moving therethrough;
   b. means located upstream of said die for continuously moving an elongated electrical conductor through the channel die;
   c. means comprising a rotatable extruder screw within the extruder barrel for plasticizing and progressively moving a heat activatable, crosslink curable polymer compound into and through the converging entry and channel die and thereby continuously molding said curable polymer compound about the elongated conductor moving through the die; and
   d. electrical induction heating means comprising a combination of an electrical induction coil positioned surrounding the area of the entry to the die and a cooperating heat generating metal induction core member positioned substantially concentrically within and spaced apart from the entry to the die whereby a heat activated, crosslink curable polymer compound progressively moving into and through the die passes over the heat generating metal induction core and the temperature thereof is abruptly increased, said outlet passage of the extruder barrel adjoining the converging entry to the channel die and the heat generating metal induction core being affixed to the end of the extruder screw adjacent to the outlet of the barrel with a body of thermal insulation intermediate the screw and the heating induction core to insulate the screw from the heat generated within the core to thereby confine the heating of the progressively moving heat activated, crosslink curable polymer compound to the portion thereof entering into the channel die.

4. The apparatus of claim 2, wherein the outlet passage of the extruder barrel adjoins a traversing passage of a cross head unit leading to the die entry and channel die and the elongated conductor moves along the traversing passage and through the die.

5. The apparatus of claim 4, wherein a guide member is positioned substantially concentrically within and spaced apart from the traversing passage with an end adjacent the entry of the die, and the heat generating metal induction core is affixed to the end of said guide member adjacent the entry of the die with a body of thermal insulation intermediate the guide member end and the induction core to insulate the guide member from the heat generated within the induction core.

6. An apparatus for the continuous plasticating and heating of a heat activated, crosslink curable polymeric compound and forming therefrom an insulating covering about a moving elongated electrical conductor, comprising:
   a. a plastic forming means comprising a channel die having a converging entry thereto for the continuous molding of plastic polymeric material progressively moving therethrough;

b. means located upstream of said die for continuously moving an elongated electrical conductor through the channel die;

c. means comprising an extruder barrel having an outlet passage at one end leading to and adjoining the die entry and containing therein a rotatable extruder screw for the plasticizing and progressively moving a heat activated, crosslink curable polymer compound into and through the converging entry and channel die and thereby continuously molding said curable polymer compound about the elongated conductor moving through the die;

d. electrical induction heating means comprising a combination of an electrical induction coil positioned surrounding the entry to the die and a cooperating heat generating metal induction core member affixed to the end of the extruder screw adjacent to the outlet and positioned substantially concentrically within and spaced apart from the entry to the die whereby a heat activated, crosslink curable polymer compound progressively moving into and through the die passes over the heat generating metal induction core and the temperature thereof is abruptly increased; and e. a body of thermal insulating material intermediate the end of the extruder screw and the heat generating induction core to insulate the screw from the heat generated within the induction core to thereby confine the heating of the progressively moving heat activated, crosslink curable polymer compound to the portion thereof entering into the channel die.

7. An apparatus for the continuous plasticating and heating of a heat activated, crosslink curable polymeric compound and forming therefrom an insulating covering of a crosslink cured polymeric compound about a moving elongated electrical conductor, comprising:

a. a plastic forming means comprising an extruder cross head unit having a traversing passage therein leading to a channel die having a converging entry thereto for the continuous molding of plastic material progressively moving therethrough, said traversing passage containing a guide member positioned substantially concentrically therein and spaced apart therefrom and with an end adjacent the converging entry of the channel die;

b. means located upstream of said die for continuously moving an elongated electrical conductor through the guide member within the traversing passage and the channel die;

c. means comprising an extruder barrel having an outlet passage at one end adjoining the traversing passage of the cross head unit leading to the converging die entry and channel die, and containing therein a rotatable extruder screw for the plasticizing and continuously progressively moving a heat activated, crosslink curable polymer compound from the barrel and through the traversing passage of the cross head unit into and through the converging entry and channel die and thereby continuously molding said curable polymeric compound about the elongated conductor moving through the die;

d. electrical induction heating means comprising a combination of an electrical induction coil positioned surrounding the converging entry to the channel die and a cooperating heat generating metal induction core member affixed to the end of the guide member adjacent the converging entry of the channel die and positioned substantially concentrically encircled within and spaced apart from the converging entry to the channel die whereby a heat activated, crosslink curable polymer compound progressively moving into and through the die passes over the heat generating metal induction core and the temperature thereof is abruptly increased; and e. a body of thermal insulating material intermediate the end of the guide member and the heat generating induction core to insulate the guide member from the heat generated within the induction core and thereby confine the heating of the progressively moving heat activated, crosslink curable polymer compound to the portion thereof entering into the channel die.

* * * * *